June 23, 1970 E. LEHNER 3,516,128
APPARATUS FOR MOLDING AND ALIGNING PRISMATIC BRICKS HAVING A SUBSTANTIALLY TRAPEZOIDAL BASE
Filed Jan. 23, 1968
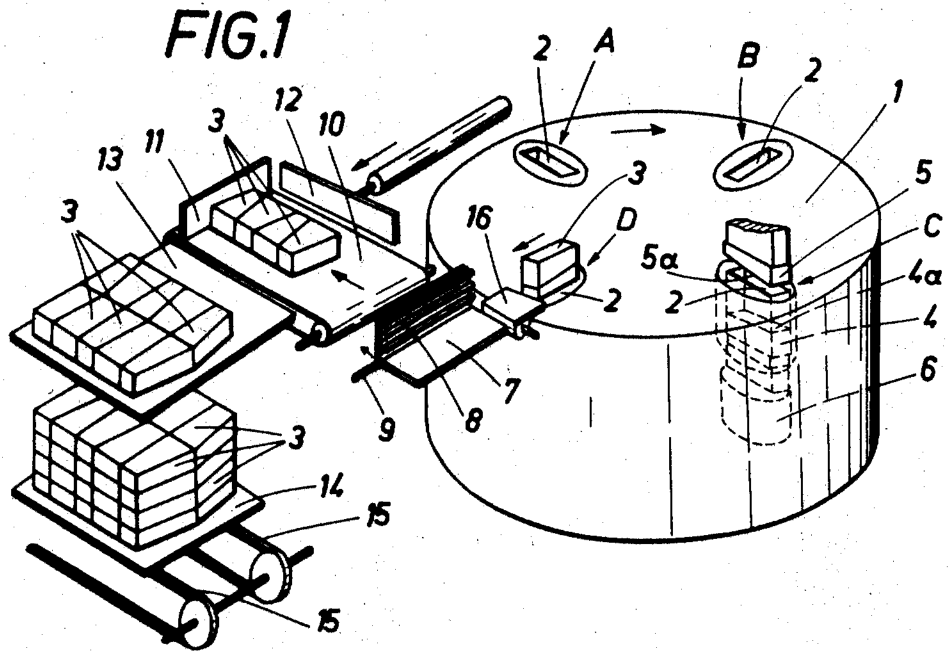
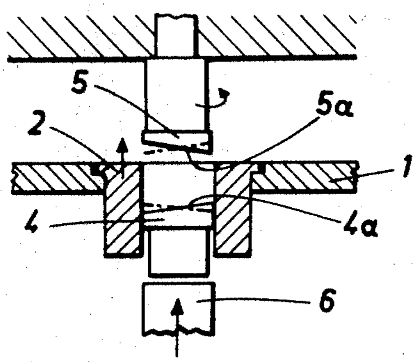
INVENTOR.
ERWIN LEHNER
BY
Kurt Kelman
AGENT

United States Patent Office 3,516,128
Patented June 23, 1970

3,516,128

APPARATUS FOR MOLDING AND ALIGNING PRISMATIC BRICKS HAVING A SUBSTANTIALLY TRAPEZOIDAL BASE

Erwin Lehner, Linz, Austria, assignor to Vereinigte Osterreichische Eisen- und Stahlwerke Aktiengesellschaft, Linz, Austria Filed Jan. 23, 1968, Ser. No. 699,903
Claims priority, application Austria, Feb. 9, 1967, A 1,231/67
Int. Cl. B28b 5/08
U.S. Cl. 25—67 6 Claims

ABSTRACT OF THE DISCLOSURE

A mounting plate carries an even number of molds and is horizontally movable into a plurality of positions, in which each of said molds is associated with one working station. Each of the molds comprises a lower die. One of said stations comprises an upper die and a ram, which is vertically reciprocable to repeatedly force said upper die and said lower die in said one station against each other in successive molding operations. The upper die and said lower die in said one station have confronting molding faces for molding oblique side faces of a brick. The molding faces of said lower dies of adjacent molds are offset by an angle of 180° about a vertical axis. The upper die is rotatable through 180° about a vertical axis between successive molding operations. Another station comprises an ejector operable to eject molded bricks from said mold in said other station, a delivery table, and a pusher operable to push thus ejected bricks onto the delivery table. The delivery table forms part of a tilting device, which is tiltable to cause a brick on said table to be tilted to rest on the base of said brick and to be delivered to a conveyor.

This invention relates to apparatus for molding and aligning prismatic bricks, preferably of dolomite, which bricks have a substantially trapezoidal base. Such bricks are required, e.g., as a lining for converters because their trapezoidal bases enable the formation of a cylindrical wall without gaps.

Apparatus are known which comprise a mounting table, which is horizontally movable from one working station to the other and is rotatable in most cases and which carries molds, which are associated with respective stations and provided each with a lower die. One of the stations comprises an upper die and a vertically reciprocable ram, which can act on the lower die or on the upper die. That upper die and the ram are stationary in said station. Another station comprises an ejector for ejecting the bricks from the mold and a pusher for pushing the bricks onto a delivery table. The confronting molding faces of the upper and lower dies correspond to the oblique side faces of the bricks so that the bricks rest on one of their oblique side faces while being ejected from the press. In the known presses the lower dies in the molds and particularly the molding faces of said dies are all aligned so that the upper die is non-rotatable. All bricks reach the delivery table in the same position, with the same parallel side face of the brick ahead. This results in considerable difficulties in the ordering of the bricks and the close spacing thereof in a stack.

A close spacing of the bricks in each row and in stacks consisting of a plurality of juxtaposed and superimposed rows is required to protect a major portion of the surface of each brick from atmospheric influences and to obtain a stable, compact stack, which can be introduced into the converter or the like. The bricks should be packed so that they rest on their base, contact each other with their oblique side faces and are alternately offset by an angle of 180° in the horizontal direction, each smaller parallel side face of a brick being adjoined by a larger parallel side face of another brick at the longitudinal edges of the rows which are formed. As all bricks rest on an oblique side face and are aligned when they reach the delivery table, it has previously been required not only to tilt the bricks on their base but to rotate them alternately through 180° in a horizonal direction in order to obtain the described stacking. This involves complicated and straining operations if the work is carried out by hand, or relatively complicated devices for ordering and stacking the bricks.

It is an object of the invention to provide a relatively simple apparatus which enables the desired aligning and stacking of the bricks.

The invention is based on apparatus for molding and aligning prismatic bricks, preferably dolomite bricks, which bricks have a substantially trapezoidal base, in which apparatus a mounting table is horizontally movable from one working station to another and carries an even number of molds, which are associated with respective stations and provided with a lower die each, an upper die and a vertically reciprocable ram are provided in one of the stations and stationary relative thereto, the confronting molding faces of the upper and lower dies correspond to the oblique side faces of the brick, another station comprises an ejector for ejecting the bricks from the mold and a pusher for pushing the bricks onto a delivery table, and resides essentially in that the molding faces of the lower dies in adjacent molds are relatively offset by an angle of 180° about a vertical axis, the upper die is rotatable through 180° about a vertical axis after each molding operation, and the delivery table forms part of a tilting device, which tilts each brick received by it to rest on the base of the brick and forwards the brick to a conveyor. The relatively offset arrangement of the molding faces of the lower dies in adjacent molds and the rotation of the upper die after each molding operation have the result that the bricks rest on one oblique side face when reaching the delivery table but the bricks have in alternation their smaller and larger parallel side faces facing in one and the same direction so that the tilted bricks will be received on the conveyor in a row in which the smaller and larger parallel side faces of the brick alternate at the longitudinal edges of the row. A further rotating or reversing operation is not required to attain this end. It is sufficient to provide a stop in order to ensure a close contact between the oblique side faces of adjacent bricks on the conveyor. A suitable stack can easily be formed from such a properly ordered row if sections of said row are pushed off in a transverse direction.

In a development of the invention, a stop and slide wall, which is normal to the table top, is firmly connected to the delivery table on the side thereof which is adjacent to the conveyor, and the table together with the stop and slide wall is tiltable by about 90°, about an axis which is parallel to the line of intersection between the table and wall. The stop and slide wall may be provided with rollers which are parallel to the axis of tilt. This results in a simple tilting device. The brick pushed onto the delivery table comes to rest on the stop and slide wall during the tilting movement and when the tilting angle exceeds 90° simply slides from said wall by gravity onto the adjacent conveyor.

If the pusher acts in the longitudinal direction of the oblique side faces of the bricks, the delivery table is preferably preceded by a slide ramp having an adjustable inclination because the elevation of the brick end facing the delivery table changes from one mold to the next.

Embodiments of the invention are shown diagrammatically and by way of example in the accompanying drawing, in which FIG. 1 is a perspective view showing an overall apparatus for molding and aligning dolomite bricks having a trapezoidal base, and FIG. 2 is a vertical sectional view taken radially with respect to the mounting table and showing a part of the press.

The press comprises a mounting table 1, which is rotatable in the clockwise sense and carries four molds 2. The molds 2 are associated with four working stations. The mold is coated with oil in the first station A and filled with molding composition in the second station B. The molding composition is molded in the third station C. The molded brick 3 is ejected in the fourth station D. Each of the four molds 2 is provided with a lower die 4. An upper die 5 is provided only in station C and does not perform an up and down movement. A ram 6 is provided in station C. During the molding operation, the ram 6 lifts with the aid of means which are known and not shown in detail the mold 2 and the lower die 4 until the upper die 5 enters the mold. Thereafter, the molding stroke is completed by the lower die 4 alone. In station D, the molded brick is raised from the mold 2 by an ejector, not shown, and pushed onto a delivery table 7 by a pusher.

The confronting molding faces 4*a* and 5*a* of the lower and upper die correspond to the oblique side faces of the brick 3 so that the latter rests on one of its oblique side faces when the brick is discharged from the press in station D. According to the invention, the molding faces 4*a* of the lower dies 4 in adjacent molds 2 are offset by an angle of 180° about a vertical axis, as is indicated by dash-and-dot lines in FIG. 2. After each molding operation, the upper die performs one half of a revolution about a vertical axis so that the bricks reaching the delivery table have in alternation their larger and smaller parallel side faces in front.

The delivery table 7 forms part of a tilting device, which consists of the delivery table 7 and a stop and slide wall 8, which is normal to the table top and similar to a roller bed. The table 7 and the stop and slide wall 8 are jointly tiltable by somewhat more than 90° about an axis 9, which is parallel to the line of intersection of the table and wall. Each brick reaching the delivery table 7 is thus tilted to rest on its base and slides on the stop and slide wall 8 onto a succeeding conveyor 10. With the aid of a stop 11, a row of closely spaced bricks is formed on the conveyor. Sections of said row are pushed onto a plate 13 with the aid of a transverse pusher 12. When the plate 13 is fully loaded, it is lowered and laterally withdrawn so that the bricks are deposited on a pallet 14 or on a partial stack formed on said pallet. The fully loaded pallet is removed with the aid of a chain conveyor 15.

The delivery table 7 is preceded by a slide ramp 16, which is adjustable in inclination to ensure a satisfactory transfer of the brick from the press to the delivery table. The fact that the bricks have in alternation their larger and smaller parallel side faces in front results in a difference between their levels. This difference is compensated by the slide ramp 16.

What is claimed is:

1. Apparatus for molding and aligning prismatic bricks having a substantially trapezoidal base, said apparatus comprising a plurality of working stations, a mounting plate carrying an even number of molds and horizontally movable to a plurality of positions, in which each of said molds is associated with one of said stations, and a conveyor, each of said molds comprising a lower die, one of said stations comprising an upper die and a ram, said ram being vertically reciprocable to repeatedly force said upper die and said lower die in said one station against each other insuccessive molding operations, said upper die and said lower die in said one station having confronting oblique molding faces for molding oblique side faces of a brick, said molding faces of said lower dies of adjacent molds being offset by an angle of 180° about a vertical axis, said upper die being rotatable through 180° about a vertical axis, in said one station, between successive molding operations, another one of said stations comprising an ejector operable to eject molded bricks from said mold in said other station, a delivery table, and a pusher operable to push thus ejected bricks onto said delivery table, and said delivery table forming part of a tilting device, which is tiltable to cause a brick on said table to be tilted to rest on the base of said brick and to be delivered to said conveyor.

2. Apparatus as set forth in claim 1, which is designed to mold dolomite bricks.

3. Apparatus as set forth in claim 1, in which said tilting device comprises a stop and slide wall, which is normal to the top of said table and is firmly connected to the latter on the side thereof which is adjacent to said conveyor, and said table and wall are jointly tiltable through about 90° about an axis which is parallel to the line of intersection of said table and wall.

4. Apparatus as set forth in claim 3, in which said table and wall are jointly tiltable about said parallel axis through more than 90°.

5. Apparatus as set forth in claim 3, in which said stop and slide wall are provided with rollers, which are parallel to said parallel axis.

6. Apparatus as set forth in claim 1, in which said pusher is operable in the longitudinal direction of the oblique side faces of the bricks pushed by it, and a slide ramp having an adjustable inclination is arranged to receive said bricks and from said pusher and guide them onto said delivery table.

References Cited

UNITED STATES PATENTS

| | | | |
|---|---|---|---|
| 1,599,151 | 9/1926 | Vought | 25—69 |
| 2,568,956 | 9/1951 | Fienberg | 18—20 |
| 2,891,281 | 6/1959 | Heinzelman | 25—67 X |
| 2,904,835 | 9/1959 | Thomas | 25—69 X |
| 3,008,211 | 11/1961 | Boyd | 25—66 X |

J. SPENCER OVERHOLSER, Primary Examiner

B. D. TOBOR, Assistant Examiner

U.S. Cl. X.R.

18—20